United States Patent [19]

Adolfsson

[11] Patent Number: 4,824,277

[45] Date of Patent: Apr. 25, 1989

[54] MOUNTING DEVICE WITH A CLAMPING SLEEVE

[75] Inventor: Rune Adolfsson, Boras, Sweden

[73] Assignee: SKF Nova AB, Sweden

[21] Appl. No.: 64,139

[22] Filed: Jun. 19, 1987

[30] Foreign Application Priority Data

Jul. 1, 1986 [SE] Sweden ................ 8602923

[51] Int. Cl.$^4$ ................................ B25G 3/20
[52] U.S. Cl. ...................... 403/370; 403/374; 403/368
[58] Field of Search ............ 403/370, 368, 374, 371

[56] References Cited

U.S. PATENT DOCUMENTS 3,129,038  4/1964  Benson .................. 403/370 X

Primary Examiner—Andrew V. Kundrat
Attorney, Agent, or Firm—Eugene E. Renz, Jr.

[57] ABSTRACT

A device for securing a first machine element to a second machine element comprising a clamping sleeve disposed between said machine elements having first and second opposed clamping surfaces forming opposing angles $\alpha$ and $\beta$ with the axis of said sleeve, one of the machine elements having complementary clamping surfaces confronting and engaging said first and second clamping surfaces, the angles ($\alpha$, $\beta$) formed between the sleeve axis and said opposed clamping surfaces being smaller than the friction angle in each associated clamping contact whereby relative rotation of said sleeve and one of the machine elements produces a clamping action over substantially the entire length of said sleeve.

8 Claims, 2 Drawing Sheets

MOUNTING DEVICE WITH A CLAMPING SLEEVE

FIELD OF THE INVENTION

The present invention relates to improvements in mounting devices.

BACKGROUND OF THE INVENTION

Different types of such devices are earlier known. One embodiment of such a device is shown in U.S. Pat. No. 3,129,038. According to this, the hole in an inner race ring of a rolling bearing and the outer side of a clamping sleeve are provided with cooperating threads. A thread flank on each thread forms a small angle with the axis of the thread. The bearing ring and the sleeve can be turned in relation to each other thus that the sleeve is screwed in against an end stop at one end of the bearing ring. At continued rotation the thread flanks will enter at a small angle up on each other, whereby the sleeve is exerted to a radial, inwardly directed pressure thus that it is clamped against a shaft enclosed by itself at the same time as the bearing ring is clamped against the sleeve. The bearing ring is thereby arrested relative to the shaft. Dismounting can be effected in that the bearing ring is turned in the opposite direction upon the sleeve, whereby the pressure upon the thread flanks ceases.

At this type of tightening, the end stop, which is constituted by a radially extending flange, is subjected to large axial forces. These can be so big that the flange is pressed loose from the element to which it is connected, whereby the device is destroyed. The part of said element supporting the flange will not take part in the radial clamping, whereby the entire axial extension of the device is never fully utilized for clamping.

SUMMARY OF THE INVENTION

The purpose of the present invention is to provide a device of the type mentioned above, by which clamping can be effected at a big force without risk for the device being destroyed and with use of the entire length of the device.

To this end in accordance with the present invention there is provided a device for securing a first machine element to a second machine element comprising a clamping sleeve disposed between said machine elements having first and secod opposed clamping surfaces forming opposing angles $\alpha$ and $\beta$ with the axis of said sleeve, one of the machine elements having complementary clamping surfaces confronting and engaging said first and second clamping surfaces, the angles $(\alpha,\beta)$ formed between the sleeve axis and said opposed clamping surfaces being smaller than the friction angle in each associated clamping contact whereby relative rotation of said sleeve and one of the machine elements produces a clamping action over substantially the entire length of said sleeve.

BRIEF DESCRIPTION OF THE DRAWINGS

Hereinafter, the invention will be further described with reference to the accompanying drawing, in which.

DESCRIPTION OF THE PREFERRED EMBODIMENTS

Figure 1:
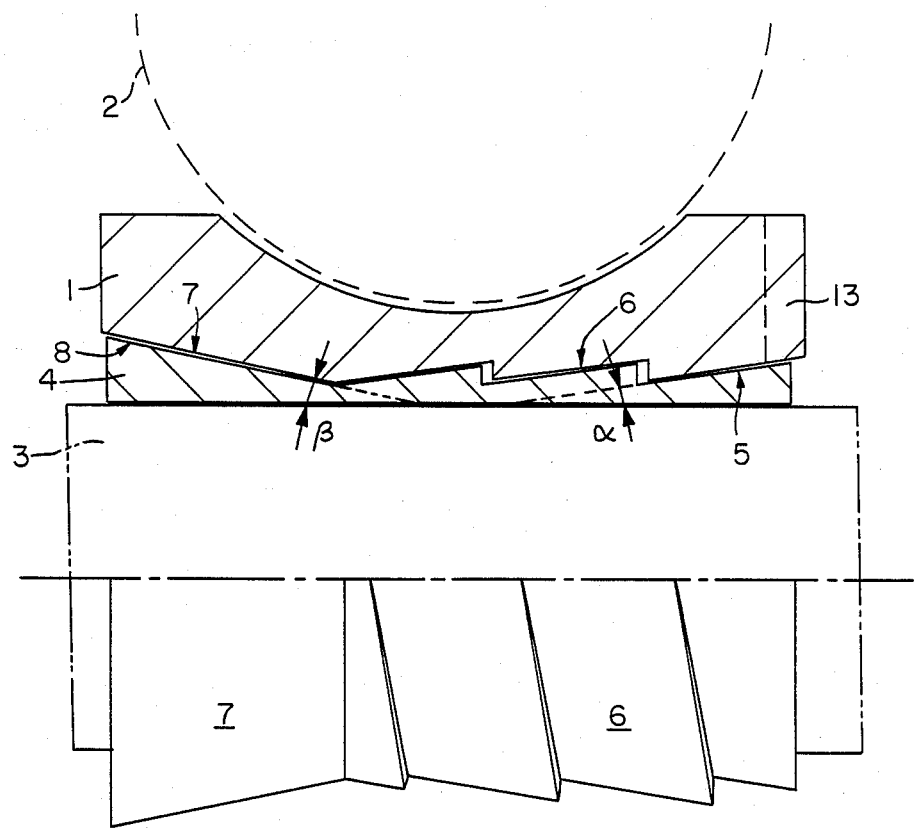
FIG. 1 shows a partial longitudinal section through a device according to an embodiment of the invention.

The device shown in FIG. 1 has a machine element 1 in form of an inner race ring of a ball bearing, in which a ball is intimated with the line 2. The bearing ring is clamped upon a shaft 3, and clamping surfaces on the bearing ring and upon a clamping sleeve 4 arranged between the ring and the shaft are arranged as cooperating thread flanks 5, 6, the longitudinal cross sectional contours of which form a small angle of inclination $\alpha$ to the axis of the sleeve. Tightening of the joint is effected in that the ring 1 is turned relative to the sleeve 4. At the turning two opposed, mainly tapering surfaces 7, 8 on the sleeve and the bearing ring respectively are pressed against each other, whereby a stop is formed thus that the turning results in that the flanks 5, 6 are pressed radially against each other and the sleeve is deformed to clamping against the shaft 3. The tapering surfaces 7, 8 are designed thus that the taper inclination angle $\beta$ is smaller than 45°. It is thereby ascertained that a powerful and enduring radial clamping force is obtained over the sleeve also in the tapering area. The entire length of the sleeve is thus utilized for transferring clamping force. The small angle $\beta$ gives the further advantage in comparison with an ordinary flange where the angle $\beta$ is 90°, that the joint between the threaded and the tapering areas has no shaft angular change thus that a weakening fillet effect is avoided in the area of the sleeve, where the axial pulling force is generated at tightening of the joint. The radial clamping on the entire length of the sleeve and the friction between the sleeve and the shaft furthermore results in that the axial pulling force will become comparatively small. In known devices where tightening is effected against a radially extending flange upon the sleeve or the ring, a heavily weakened fillet is formed at the root of the flange, and the friction taking up axial forces between shaft and part of sleeve or machine element provided with flange, is furthermore lacking, whereby the axial force generated will be big in the area of the fillet.

The angles $\alpha$ and $\beta$ or the longitudinal sectional contours of thread flanks and opposed surfaces 7, 8 against the axis of the sleeve are preferably smaller than the friction angle in each contact, i.e. $\tan \alpha <= \mu_1$ and $\tan \beta <= \mu_2$, where $\mu_1$ = the coefficient of friction in the contact between the thread flanks and $\mu_2$ = the coefficient of friction in the contact between the opposed surfaces 7, 8. The coefficient of friction in a contact steel against steel is about 0.15, whereby the angles are preferably smaller than about 10°.

The friction surfaces, are therefore, irreversible in both contacts. This means that even if the sleeve 4 should be pulled off in the area between the taper and the thread at tightening or during operation, the radial clamping force will be maintained in both contacts, which means a big security. The friction in these contacts also prevents that the machine element 1 is unintentionally wound off the sleeve during operation. Such a winding-off is unlikely to happen if the machine element is a bearing ring, for the reason that the only turning moment which under operation is exerted upon the bearing ring is caused by the internal friction of the bearing, which friction is rather low.

The angle $\beta$ is preferably bigger than the angle $\alpha$ in order to present an axial sliding of the machine element 1 upon the sleeve at the tightening operation. The contact with the bigger angle $\beta$ thereby settles the position, and the tightening means that the flat thread flanks, which define the angle $\alpha$ are presseda against each other, whereby a axial slot is formed between the steep, radial flanks in the threads. In order to bring about an evenly distributed surface pressure in the clamping surfaces and for compensating for said slot, the flat thread flanks preferably have a bigger area than the area of the opposed surfaces 7, 8.

Figure 2:
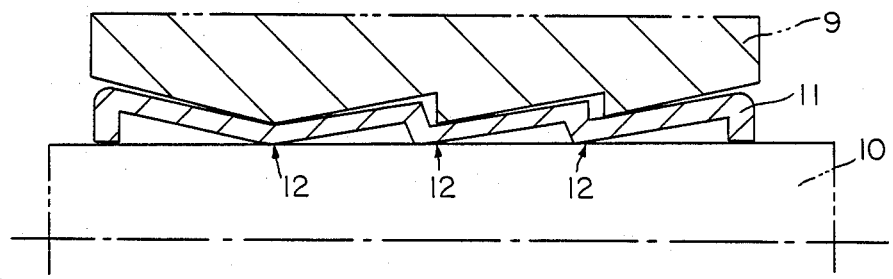
FIG. 2 shows a longitudinal section through a portion of a device according to another embodiment of the invention.

FIG. 2 shows another embodiment of the invention, in which a machine element is clamped on a shaft 10 by means of a sleeve 11 made of stamped sheet metal. The forming method for the sleeve results in a longitudinal cross sectional profile of the internal surface of the sleeve mainly corresponding to the cross sectional profile of the outer surface. Such a sleeve is of low weight and is simple and cheap to manufacture, e.g. it can be formed by rolling a sheet metal belt or the like. In order to give a favorable contact between sleeve and shaft the thread flanks of the bore of the sleeve are preferably beveled at the top, whereby a cylindric helical surface 12 will contact the shaft 10.

Figure 3:
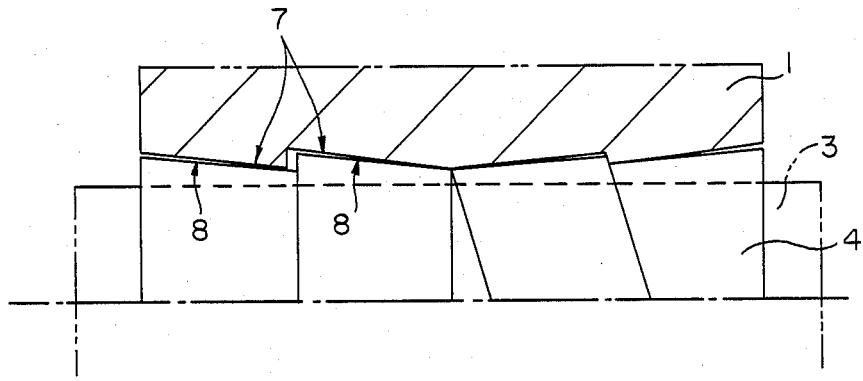
FIGS. 3 and 4 show partial side views of sleeves in device according to further embodiments of the invention.

The surfaces 7, 8 can be subdivided in a number of tapering portions the longitudinal cross sectional contours of which form a saw tooth form, such as shown in FIG. 3. The radial dimensions of the sleeve 4, therefore, can be kept small. An axially slotted sleeve of this type can be mounted in a bore, e.g. in a bearing ring by being disformed radially and thereupon being pushed into position.

Figure 4:
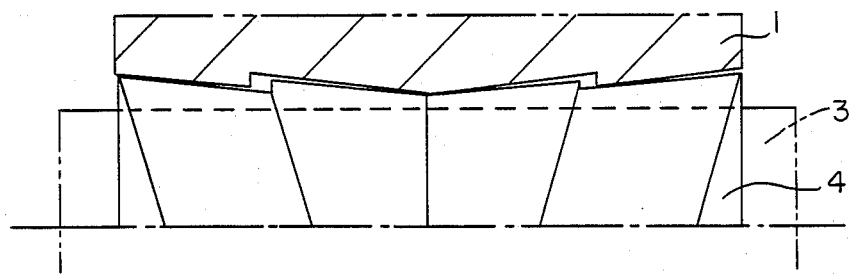

FIG. 4 shows a variation of the invention where the sleeve has two threaded portions with flat thread flanks which act as clamping surfaces. The two threaded portions have opposed thread pitch, whereby turning of the sleeve 4 relative to the associated machine element 1 results in a clamping force occuring at the surfaces of the flat thread flanks without any axial displacement of the member 1, thereby taking place relative to sleeve 4 and shaft 3. Also, in this case, the sleeve is preferably slotted in order to allow mounting in the element 1.

Many different embodiments of the invention are possible within the scope of the claims. The device can, for instance, with evident modifications be used for clamping a bearing outer race ring in a housing. The sleeve can be non-slotted or have one or more longitudinal slots in order to reduce the deformation resistance. The machine element can be provided with recesses (13 in FIG. 1) for e.g. a hook spanner, which can be used at the turning of the element on the shaft or the sleeve. A sleeve normally must not be kept firm on the shaft with a specific tool, but if necessary it is, of course, possible to provide also the sleeve with means for co-operation with such. Locking of the sleeve against turning relative to the machine element can be effected, e.g. with a locking ring or by a portion of the sleeve being disformed plastically in a recess in the machine element. After mounting, the sleeve may be entirely covered by the machine element, which is space saving in axial direction. A sleeve according to FIG. 2 can be fitted e.g. to a shaft in that the cavities present between the sleeve and the shaft are filled with an adhesive.

A sleeve which is provided with a helical surface, which contacts a smooth surface on a shaft or in a housing with a sufficient clearance, can be displaced to desired position in that it is screwed upon the shaft or into the housing. In certain cases the position can then be maintained during operation without further arrangements.

A sleeve according to the invention can be made, e.g. of metal or plastic material or combinations thereof. Mounting can be facilitated if the coefficient of friction of the sleeve against the machine element is smaller than the coefficient of friction against the shaft or against the housing.

What is claimed is:

1. A device for securing a first machine element to a second machine element comprising a clamping sleeve disposed between said machine elements having first and second opposing clamping surfaces forming opposing angles $\alpha$ and $\beta$ with the axis of said sleeve and with at least one of the clamping surfaces being formed by thread flanks one of the machine elements having complementary clamping surfaces confronting and engaging said first and second clamping surfaces, the angle $(\alpha,\beta)$ formed between the sleeve axis and said opposed clamping surfaces being smaller than the friction angle in each associated clamping contact whereby relative rotation of said sleeve and one of the machine elements produces a clamping action over substantially the entire length of said sleeve.

2. A device according to claim 1, characterized in that the angles $(\alpha,\beta)$ formed between the sleeve axis and the thread flanks and the longitudinal cross sectional contours of said opposed surfaces respectively, are smaller than the friction angle in each associated clamping contact.

3. A device according to claim 1, characterized in that the angle $(\alpha)$ between the longitudinal cross sectional contours of the thread flanks and the sleeve axis is smaller than the angle $(\beta)$ of said longitudinal cross sectional contours of said opposed surfaces against the sleeve axis.

4. A device according to claim 1, characterized in that the area of the thread flanks is bigger than the area of said opposed surfaces.

5. A device according to claim 1, characterized in that said opposed surfaces are constituted by a number of conical portions, the longitudinal cross sectional contour of which form a saw tooth form.

6. A device according to claim 1, characterized in that said opposed surfaces are constituted by thread flanks of opposed pitch as compared to said first mentioned thread flanks.

7. A device according to claim 1, characterized in that the sleeve is made from stamped sheet metal, whereby the inner surface profile of the sleeve substantially corresponds to the outer surface profile.

8. A device according to claim 1, characterized in that the axial length of the sleeve is less than the length of the outer machine element.

* * * * *